United States Patent [19]

Moreland, Sr.

[11] Patent Number: 5,431,423
[45] Date of Patent: Jul. 11, 1995

[54] BOAT AND UTILITY TRAILER

[76] Inventor: Joe W. Moreland, Sr., 117 4th St., Minden, La. 71055

[21] Appl. No.: 259,915

[22] Filed: Jun. 10, 1994

[51] Int. Cl.⁶ .................... B60F 5/00; B62D 61/12
[52] U.S. Cl. ..................... 280/400; 280/414.1; 280/80.1; 280/1
[58] Field of Search ............... 280/300, 414.1, 28.5, 280/62, 80.1, 105, 767; 180/20

[56] References Cited

U.S. PATENT DOCUMENTS

| | | | |
|---|---|---|---|
| 2,332,991 | 10/1943 | Commire | 280/143 |
| 3,333,861 | 8/1967 | Hoffman | 280/47.32 |
| 3,771,809 | 11/1973 | Carn | 280/47.13 |
| 3,955,830 | 5/1976 | Hardwick | 280/414 B |
| 4,331,346 | 5/1982 | Walters | 280/414.1 |
| 4,407,519 | 10/1983 | Heyser | 280/414.1 |
| 4,448,438 | 5/1984 | DeWalk | 280/414.1 |

FOREIGN PATENT DOCUMENTS

| | | | |
|---|---|---|---|
| 1209301 | 3/1960 | France | 280/767 |
| 1558755 | 4/1990 | U.S.S.R. | 280/28.5 |

Primary Examiner—Margaret A. Focarino
Assistant Examiner—Kevin Hurley
Attorney, Agent, or Firm—John M. Harrison

[57] ABSTRACT

A boat and utility trailer including an elongated, cylindrical wheel rotatably mounted on the trailer axle between the conventional trailer wheels to support the trailer on sand, mud or the like as the trailer is towed over soft terrain by a vehicle. In a preferred embodiment the boat and utility trailer is characterized by a horizontal tongue support provided with an axle support or bracket extending vertically downwardly from each end of the tongue support. An axle extends through the axle supports and a trailer wheel is journalled for rotation on each end of the axle. A tongue extends forwardly from the tongue support and is fitted with a trailer hitch on the extending end for connection to a towing vehicle. The elongated, cylindrical wheel has a diameter slightly less than the diameter of the trailer wheels, is journalled for rotation on the axle between the axle supports and carries the trailer over dirt, sand or mud when the conventional trailer wheels begin to sink in the soft terrain as the trailer is towed by the vehicle. In another preferred embodiment the tongue may be removed from the tongue support and disassembled to facilitate space-efficient storage of the boat and utility trailer when the trailer is not in use.

20 Claims, 1 Drawing Sheet

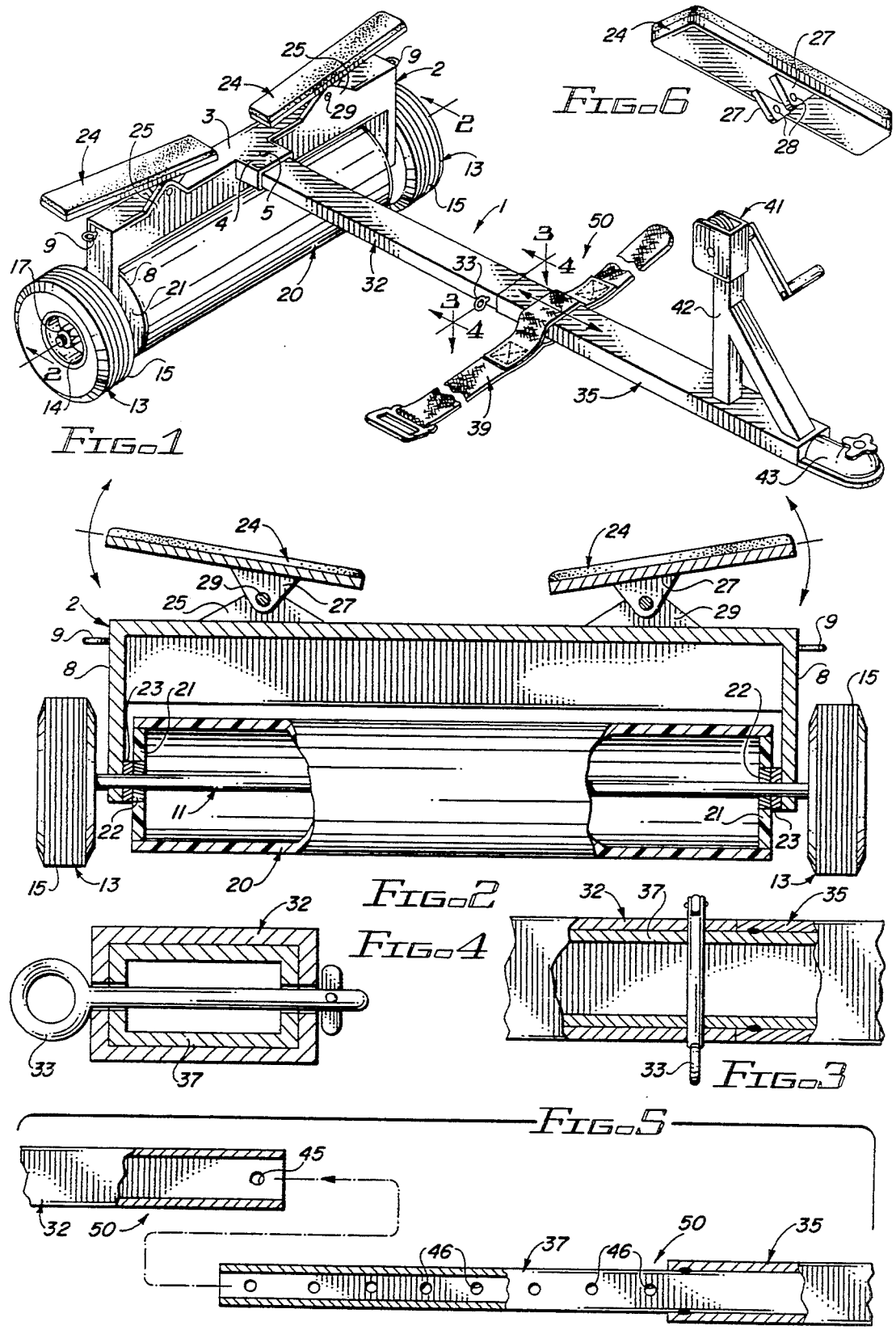

BOAT AND UTILITY TRAILER

BACKGROUND OF THE INVENTION

1. Field of the Invention

This invention relates to boat and utility trailers and more particularly, to a boat and utility trailer including an elongated, cylindrical wheel rotatably mounted on the trailer axle between the trailer wheels to support the trailer in soft sand, dirt, mud or the like as the trailer is towed over the soft terrain by a vehicle. In a preferred embodiment the boat and utility trailer is characterized by an elongated, horizontal tongue support or frame provided with a pair of spaced axle supports or brackets, each extending perpendicularly downwardly from the corresponding end of the frame. A fixed axle extends through an axle opening provided in each axle support and a wheel is journalled for rotation on each protruding end of the axle. A pair of wheel hubs are mounted on the axle between the axle supports in spaced relationship with respect to each other and a cylindrical wheel, characterized by an elongated tube having a diameter slightly less than the diameter of the trailer wheels, receives the wheel hubs. A trailer tongue extends forwardly from the frame and is provided on the extending end with a hitch device for attachment to a towing vehicle. A rear tie-down strap may be secured to each axle support and a front tie-down strap may also be provided on the tongue for securing a boat on the frame and tongue, respectively. In another preferred embodiment, the tongue is constructed in multiple segments and may be removed from the frame and disassembled, to facilitate space-efficient storage of the boat trailer when the trailer is not in use. In still another embodiment, a conventional boat winch is mounted on the tongue for securing a boat on the trailer.

One of the problems frequently encountered in towing a boat trailer is that the trailer must be towed over soft terrain such as mud, sand, dirt or the like, in order to reach a suitable boat-launching and/or recovery site located at the edge of a lake or other water body. This frequently results in the trailer wheels sinking and becoming stuck in the mud or sand, increasing the difficulty encountered in towing the boat to or from the launching and/or recovery site. The cylindrical wheel mounted on the boat trailer of this invention has a uniform, elongated, supportive configuration and therefore does not have a tendency to sink and become stuck in soft sand, dirt or mud. Since the cylindrical wheel has a diameter slightly less than the diameter of the trailer wheels, the cylindrical wheel supports the trailer on the surface of the sand, dirt or mud when the trailer wheels begin to sink and bog down in the soft terrain as the trailer is towed by a vehicle.

2. Description of the Prior Art

Various trailers and other devices for carrying boats and the like, are known in the art. U.S. Pat. No. 2,332,991, dated Oct. 26, 1943, to Henry L. Commire, describes a "Self-Adjustable Cradle For Boat Trailers" adapted for mounting transversely on a conventional boat trailer to accommodate and support the bottom surface of a boat carried on the trailer. U.S. Pat. No. 3,333,861, dated Aug. 1, 1967, to William B. Hoffman, discloses a "Roller Assembly For Boats", in which one or more elongated rollers are adjacently mounted on an axle positioned beneath the boat by vertical struts which are removably secured to the sides of the boat. U.S. Pat. No. 3,771,809, dated Nov. 13, 1973, to Patrick Carn, details a "Device For Transporting Loads On Uneven or Shifting Ground and Also For Launching Small Boats", characterized by a supporting chassis provided with an adjustable supporting mechanism which can adapt to the conformation of the load to be transported. U.S. Pat. No. 3,955,830, dated May 11, 1976, to Richard H. Hardwick, describes a "Foldable Boat Trailer" which may be collapsed for easy storage or shipment and is adapted for suspending a boat thereunder for transport. U.S. Pat. No. 4,331,346, dated May 25, 1982, to Klemens C. Walters, discloses a "Telescoping Trailer For Boats and the Like", characterized by a trailer main frame and a tongue member extending forwardly from the main frame. At least one sleeve member having a substantially rectangular cross-section is provided on the main frame for slidably receiving the tongue member. A mechanism is located in the sleeve member for reversibly stabilizing the tongue member with respect to the main frame. U.S. Pat. No. 4,407,519, dated Oct. 4, 1983, to Gregory L. Heyser, details a "Boat Trailer Tongue Extender" for removable attachment to the tongue of a boat trailer to enable the launching vehicle to stay away from the uncertain ground located near the edge of a water body. The extender latches into a receptacle permanently installed on the trailer tongue, allowing the attachment or removal of the extender in three steps without the use of tools, bolts or pins. U.S. Pat. No. 4,448,438, dated May 15, 1984, to Arnold R. Dewalk, describes a "Boat Trailer With Improved Aft Support Cradle", characterized by an aft support cradle which pivots relative to an elongated trailer frame in an advantageous manner to assist in boat launching and recovery operations.

It is an object of this invention to provide a boat and utility trailer for carrying a boat or other item or load over paved and unimproved roads, as well as soft sand, mud, dirt or the like.

Another object of this invention is to provide a boat and utility trailer including a cylindrical wheel which is rotatably mounted on the trailer axle between the conventional trailer wheels and has a diameter slightly less than the diameter of the conventional trailer wheels, to support the trailer over sand, mud or dirt when the trailer wheels begin to bog down as the trailer is towed over the soft terrain.

Still another object of this invention is to provide a boat and utility trailer including a trailer tongue which may be removed from the trailer frame and disassembled to facilitate space-efficient storage of the trailer.

Yet another object of this invention is to provide a boat trailer including a pair of boat supports pivotally mounted on the trailer in adjacent relationship with respect to each other to accommodate the configuration of the bottom of a boat carried on the boat trailer.

SUMMARY OF THE INVENTION

These and other objects of the invention are provided in a boat and utility trailer having a trailer frame characterized in a referred embodiment by an elongated, horizontal beam, tongue support or frame including an axle support or bracket extending perpendicularly downwardly from each end of the tongue support. A trailer axle extends through the parallel axle supports in fixed relationship and a wheel is journalled for rotation on each end of the axle. A tongue extends forwardly from the frame and is provided with a hitch mechanism on the extending end for connection to a towing vehicle.

An elongated, cylindrical wheel having a diameter slightly less than the diameter of the trailer wheels is journalled for rotation on the axle between the axle supports to support the trailer frame over sand, dirt or mud when the trailer wheels begin to sink and bog down in the soft terrain as the trailer is towed by a vehicle. In another preferred embodiment the tongue is constructed in several segments and may be removed from the tongue support and disassembled to facilitate space-efficient storage of the boat and utility trailer. In still another preferred embodiment, a winch is mounted on the tongue to secure a boat on the trailer frame.

BRIEF DESCRIPTION OF THE DRAWINGS

The invention will be better understood by reference to the accompanying drawing, wherein:

FIG. 1 is a perspective view of a preferred embodiment of the boat and utility trailer of this invention;

FIG. 2 is a rear view, partially in section, of the boat and utility trailer illustrated in FIG. 1;

FIG. 3 is a top sectional view of the tongue element of the boat and utility trailer, taken along section line 3—3 in FIG. 1 and more particularly detailing a preferred technique for removably attaching the front tongue segment element of the trailer to the rear tongue segment element;

FIG. 4 is a front sectional view of the tongue element of the boat and utility trailer, taken along section line 4—4 in FIG. 1 and illustrating a pin technique for removably attaching the front tongue segment element of the trailer to the rear tongue segment element;

FIG. 5 is a side view of the tongue element of the boat and utility trailer, illustrating a preferred technique for removably connecting the front tongue segment element to the rear tongue segment element; and FIG. 6 is a bottom perspective view of a boat support element of the boat and utility trailer of this invention.

DESCRIPTION OF THE PREFERRED EMBODIMENTS

Referring initially to FIGS. 1, 2 and 6 of the drawing, in a first preferred embodiment the boat and utility trailer of this invention is generally illustrated by reference numeral 1. As illustrated in FIGS. 1 and 2, the boat and utility trailer 1 includes a wheel frame 2, characterized by an elongated, horizontal beam or tongue support 3, typically constructed of steel or aluminum. A box-shaped tongue support bracket 4, including a central first tongue bracket pin opening 5, provided in the top surface thereof and an aligned, second tongue bracket pin opening (not illustrated) provided centrally in the bottom surface thereof, extends perpendicularly forwardly from the midpoint of the front surface of the tongue support 3. A pair of boat support cleats 25, each provided with a central cleat bolt opening (not illustrated), are welded or bolted on, or formed integrally with, the top surface of the tongue support 3, in spaced relationship with respect to each other. As illustrated in FIGS. 2 and 6, a pair of boat support brackets 27, each provided with a bracket bolt opening 28, is welded or otherwise attached to the bottom surface of a rectangular boat support 24. Each boat support 24 is pivotally mounted on the corresponding boat support cleat 25 by means of a bolt 29, which is first extended through the bracket bolt opening 28 provided in one bolt support bracket 27, then through the corresponding cleat bolt opening (not illustrated) and finally through the bracket bolt opening 28 provided in the opposite bolt support bracket 27. The end of each bolt 29 threadably receives a nut (not illustrated).

As illustrated in FIGS. 1 and 2, an axle support 8 extends perpendicularly downwardly from welded or otherwise fixed attachment to each end of the tongue support 3 and an axle mount opening (not illustrated) extends laterally and horizontally through each axle support 8, near the lower end thereof. An axle 11 extends through each axle mount opening and spans the axle supports 8, to which it is welded or bolted on leaf springs (not illustrated) in conventional fashion. Each threaded end of the axle 11 protrudes beyond the lateral surface of the corresponding axle support 8 and an eye bolt 9 is threaded in each axle support 8 to facilitate attachment of a rear tie down strap (not illustrated) to the wheel frame 2. A wheel 13, including a wheel rim 14, a pneumatic tire 15 mounted on the wheel rim 14 and a threaded bearing opening (not illustrated) extending through the wheel rim 14, is bolted on a wheel hub (not illustrated) mounted for rotation in conventional fashion on the corresponding threaded, protruding end of the axle 11. A wheel nut 17 is threaded on each end of the axle 11 to engage the corresponding wheel hub (not illustrated) and thus allow free rotation of the corresponding wheel 13 on the axle 11. A pair of cylindrical wheel hubs 21 are similarly rotatably mounted on the axle 11 by means of hub bearings 22 in spaced relationship with respect to each other between the axle supports 8. An elongated, tubular, cylindrical wheel 20, typically constructed of polyvinyl chloride (PVC) and having a diameter less than the diameter of each wheel 13, spans the cylindrical wheel hubs 21, each open end of the cylindrical wheel 20 receiving the corresponding cylindrical wheel hub 21, as illustrated in FIG. 2. The respective wheel hubs 21 are spaced from the axle supports 8 by spacers 23.

Referring now to FIGS. 1 and 3-5 of the drawing, a trailer tongue 50 includes a rear tongue segment 32, the rear end of which is removably inserted in the open-ended tongue support bracket 4, as illustrated in FIG. 1, and secured therein by means of a tongue bracket pin (not illustrated). The tongue bracket pin is first extended through the first tongue bracket pin opening 5, through a rear tongue segment top pin opening (not illustrated) provided in the top surface of the rear tongue segment 32, then through a rear tongue segment bottom pin opening (not illustrated) provided in the bottom surface of the rear tongue segment 32 and finally through the second tongue bracket pin opening (not illustrated, located in the bottom surface of the tongue support bracket 4). As illustrated in FIG. 5, a pair of aligned pin openings 45 is provided adjacent to the front end of the hollow rear tongue segment 32, each pin opening 45 located in the corresponding side of the rear tongue segment 32. An elongated, hollow front tongue segment 35 is welded to a rearwardly-extending, hollow front tongue segment mount 37 which includes multiple, horizontally-spaced pairs of aligned mount openings 46, each mount opening 46 provided in the corresponding side of the front tongue segment mount 37. The open front end of the rear tongue segment 32 receives the front tongue segment mount 37 which is slidably and telescopically extended in the rear tongue segment 32, such that the pin openings 45 are aligned with a selected pair of mount openings 46, depending on the desired length of the trailer tongue 50. As illustrated in FIGS. 3 and 4, a rear tongue segment pin 33 is first extended through one of the pin openings 45, through the selected pair of aligned mount openings 46 and finally through the opposite pin opening 45, to adjustably secure the rear tongue segment 32 on the front tongue segment mount 37.

As illustrated in FIG. 1, a conventional trailer hitch receptacle 43, designed to receive a conventional hitch ball (not illustrated) provided on a towing vehicle (not illustrated), is welded or bolted to the front extending end of the front tongue segment 35. A conventional winch 41, fitted with a winch strap (not illustrated) is optionally mounted on a winch mount or pedestal 42, welded or bolted to the front tongue segment 35 behind the trailer hitch 43. An optional webbing or front tie-down strap 39 having a selected length is mounted transversely on the front tongue segment 35, under circumstances where a winch 41 is not used to secure a boat or load on the front tongue segment 35 of the boat and utility trailer 1.

Referring again to FIG. 1 of the drawing, the boat or utility trailer 1 is designed to carry a load, and in particular, a boat (not illustrated) such as a canoe, pirogue, ion boat or the like. The boat is placed on the boat and utility trailer 1 such that the front portion of the boat rests on the front tongue segment 35 of the tongue 50 and the middle or rear portion of the boat rests on the boat supports 24, which pivot on the respective boat support cleats 25 to accommodate the shape of the boat bottom. A rear tie-down strap (not illustrated) may be attached to the eye bolts 9 and fastened around the rear portion of the boat and the optional front tie-down strap 39 is similarly fastened around the front end of the boat to secure the boat on the boat and utility trailer 1 if a winch 41 is not mounted on the front tongue segment 35. Alternatively, a winch 41 may be provided and operated to secure the boat on the boat and utility trailer 1 using a winch strap (not illustrated) in conventional manner. The trailer hitch receptacle 43 is then positioned to receive a conventional ball (not illustrated) provided on the rear end of a towing vehicle (not illustrated). When the vehicle tows the boat and utility trailer 1 on a road, the wheels 13 engage and traverse the road and the cylindrical wheel 20 is suspended on the axle 11 above the road. As the boat trailer 1 is towed through thick dirt, soft sand, mud or the like, and the wheels 13 begin to sink and bog down in the soft terrain, the cylindrical wheel 20 then engages and supports the boat and utility trailer 1 on the dirt, sand or mud.

The trailer tongue 50 of the boat and utility trailer 1 may be easily removed from the tongue support 3 and disassembled and the trailer conveniently stored, by disengaging the rear tongue segment pin 33 from the pin openings 45 and removing the front tongue segment mount 37 from the rear tongue segment 32. The tongue bracket pin (not illustrated) is then disengaged from the pin opening 5 and the rear tongue segment 32 removed from the tongue support bracket 4. The wheel frame 2, including the wheels 13 and cylindrical wheel 20, may then be stored as a unit and the rear tongue segment 32 and front tongue segment 35 stored separately.

It is understood that the trailer tongue 50 may be constructed in a single, continuous length which is fixedly attached to the tongue support 3, but is preferably constructed in two or more separable segments, to facilitate maximum space-efficient storage of the boat trailer 1, as described above. The cylindrical wheel 20 may be constructed of metal or plastic having a sufficient wall thickness to provide maximum support to the boat trailer 1 on the surface of soft sand, dirt, mud or the like.

It is further appreciated that the boat and utility trailer 1 can be used both as a boat and a utility trailer to haul various loads and cargo such as boats, furniture, trash, lumber and the like, in non-exclusive particular, by extending the front tie-down strap 39 and a rear strap (not illustrated) connected to the eye bolts 9, around the load to secure the load, as heretofore described.

While the preferred embodiments of the invention have been described above, it will be recognized and understood that various other modifications may be made in the invention and the appended claims are intended to cover all such modifications which may fall within the scope and spirit of the invention.

Having described my invention with the particularity set forth above, what is claimed is:

1. A trailer for towing by a vehicle over soft surfaces and hard surfaces, comprising a trailer frame; an axle carried by said trailer frame; a pair of wheels having a first diameter and journalled for rotation on said axle for traversing the hard surfaces; cylindrical wheel means having a second diameter and journalled for rotation on said axle between said wheels, said second diameter being smaller than said first diameter of said wheels for traversing the soft surfaces; tongue means attached to said trailer frame; and hitch means provided on said tongue means for connecting said trailer to the vehicle.

2. The trailer of claim 1 comprising winch means mounted on said tongue means and a winch strap provided on said winch means for attachment to a load and securing the load on said trailer.

3. The trailer of claim 1 wherein said tongue means comprises a tongue support bracket fixed to said trailer frame and an elongated tongue having one end engaging said tongue support bracket and the opposite end of said tongue receiving said hitch means.

4. The trailer of claim 3 comprising winch means mounted on said tongue and a winch strap provided on said winch means for attachment to a load and securing the load on said trailer.

5. The trailer of claim 1 comprising watercraft support means provided on said trailer frame for supporting a watercraft.

6. The trailer of claim 5 comprising winch means mounted on said tongue means and a winch strap provided on said winch means for attachment to the watercraft and securing the watercraft on said watercraft support means.

7. The trailer of claim 6 wherein said tongue means comprises a tongue support bracket fixed to said trailer frame and an elongated tongue having one end removably engaging said tongue support bracket and the opposite end of said tongue receiving said hitch means and said winch means.

8. The trailer of claim 1, wherein said cylindrical wheel means comprises a cylinder disposed longitudinally between said wheels with said axle extending longitudinally through said cylinder and a pair of wheel hubs mounted in the ends of said cylinder, with said wheel hubs journalled for rotation on said axle, for rotatably mounting said cylinder on said axle.

9. The trailer of claim 8 comprising watercraft support means provided on said trailer frame for supporting a watercraft.

10. The trailer of claim 9 comprising winch means mounted on said tongue means and a winch strap provided on said winch means for attachment to the watercraft and securing the watercraft on said watercraft support means.

11. The trailer of claim 10 wherein said tongue means comprises a tongue support bracket fixed to said trailer frame and an elongated tongue having one end removably engaging said tongue support bracket and the opposite end of said tongue receiving said hitch means and said winch means.

12. The trailer of claim 9 wherein said tongue means comprises a tongue support bracket fixed to said trailer frame and an elongated tongue having one end engaging said tongue support bracket and the opposite end of said tongue receiving said hitch means and comprising a winch mounted on said opposite end of said elongated tongue and a winch strap provided on said winch for attachment to the watercraft and securing the watercraft on said watercraft support means.

13. The trailer of claim 8 wherein said tongue means comprises a tongue support bracket fixed to said trailer frame and an elongated tongue having one end engaging said tongue support bracket and the opposite end of said tongue receiving said hitch means and comprising:
(a) a pair of watercraft supports provided on said trailer frame for supporting a watercraft; and
(b) a winch mounted on said opposite end of said tongue and a winch strap provided on said winch for attachment to the watercraft and securing the watercraft on said watercraft supports.

14. The trailer of claim 1 wherein said tongue means comprises a tongue support bracket fixed to said trailer frame; an elongated rear tongue segment having one end engaging said tongue support bracket; a tongue segment mount removably engaging the opposite end of said rear tongue segment; a front tongue segment having one end attached to said tongue segment mount and the opposite end of said front tongue segment receiving said hitch means; and retainer means engaging said rear tongue segment, said tongue support bracket and said front tongue segment, whereby said front tongue segment is removable from said rear tongue segment by disengagement of said retainer means from said tongue support bracket.

15. The trailer of claim 14 comprising watercraft support means provided on said trailer frame for supporting a watercraft.

16. The trailer of claim 15 comprising winch means mounted on said front tongue segment and a winch strap provided on said winch means for attachment to the watercraft and securing the watercraft on said watercraft support means.

17. The trailer of claim 14 comprising:
(a) at least one pair of watercraft supports provided on said trailer frame for supporting a watercraft; and
(b) a winch mounted on said front tongue segment and a winch strap provided on said winch for attachment to the watercraft and securing the watercraft on said watercraft supports.

18. A boat and utility trailer for removable attachment to a vehicle fitted with a hitch ball and towing by the vehicle over soft surfaces and hard surfaces, said boat trailer comprising a frame; an axle fixedly carried by said frame; a pair of wheels having a first diameter and journalled for rotation on the ends of said axle in spaced relationship with respect to each other for supporting the boat trailer when traversing the hard surfaces; a cylindrical drum journalled for rotation on said axle between said wheels, said cylindrical drum having a second diameter less than said first diameter of said wheels, for supporting said boat trailer when traversing the soft surfaces; tongue means extending from said frame substantially normal to said axle; and a trailer ball receptacle provided on said tongue means for removably coupling said boat trailer to the hitch ball on the vehicle.

19. The boat and utility trailer of claim 18 wherein said tongue means comprises a tongue support bracket fixed to said trailer frame; an elongated rear tongue segment having one end engaging said tongue support bracket; a tongue segment mount removably engaging the opposite end of said rear tongue segment; a front tongue segment having one end attached to said tongue segment mount and the opposite end of said front tongue segment receiving said trailer ball receptacle; and retainer means engaging said rear tongue segment, said tongue support bracket and said front tongue segment, whereby said front tongue segment is removable from said rear tongue segment by disengagement of said retainer means from said tongue support bracket.

20. The boat and utility trailer of claim 19 comprising watercraft support means provided on said trailer frame for supporting a watercraft, a winch attached to said front tongue segment and a winch strap provided on said winch means for attachment to the watercraft and securing the watercraft on said watercraft support means.

* * * * *